United States Patent
Robertson et al.

(10) Patent No.: US 8,142,559 B2
(45) Date of Patent: *Mar. 27, 2012

(54) THERMAL INK JET INK COMPOSITION

(76) Inventors: Casey Robertson, Romeoville, IL (US); Anthony Selmeczy, West Chicago, IL (US); John P. Folkers, Palatine, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/646,162

(22) Filed: Dec. 23, 2009

(65) Prior Publication Data

US 2010/0098860 A1    Apr. 22, 2010

Related U.S. Application Data

(63) Continuation-in-part of application No. 12/059,753, filed on Mar. 31, 2008.

(51) Int. Cl.
*C09D 11/02* (2006.01)
(52) U.S. Cl. .................................... 106/31.58
(58) Field of Classification Search ................. 106/31.58
See application file for complete search history.

(56) References Cited

U.S. PATENT DOCUMENTS

| | | | |
|---|---|---|---|
| 4,199,649 A | | 4/1980 | Yundt |
| 4,975,117 A | * | 12/1990 | Tabayashi et al. .......... 106/31.58 |
| 5,998,501 A | | 12/1999 | Tsutsumi |
| 6,197,482 B1 | | 3/2001 | Lobo |
| 6,302,536 B1 | | 10/2001 | Sarma |
| 6,444,019 B1 | * | 9/2002 | Zou et al. ..................... 106/31.4 |
| 6,602,334 B1 | | 8/2003 | Kaufmann |
| 6,663,702 B1 | | 12/2003 | Day |
| 7,148,268 B2 | * | 12/2006 | Zhu et al. ..................... 523/160 |
| 7,374,605 B2 | | 5/2008 | Chung |
| 2004/0228966 A1 | | 11/2004 | Nigam |
| 2008/0000387 A1 | * | 1/2008 | Renner et al. .............. 106/31.59 |
| 2008/0066239 A1 | | 3/2008 | Zhu |
| 2008/0145628 A1 | | 6/2008 | Oyanagi |

* cited by examiner

*Primary Examiner* — Jerry Lorengo
*Assistant Examiner* — Veronica F Faison
(74) *Attorney, Agent, or Firm* — Joseph A. Yosick

(57) ABSTRACT

A thermal ink jet ink composition includes one or more volatile organic solvents, one or more humectants, one or more binder resins, and one or more dyes. The one or more volatile organic solvents are selected from $C_1$-$C_4$ alcohols, $C_3$-$C_6$ ketones, and mixtures thereof. The humectants are present in an amount not more than 30% by weight of the ink jet ink composition.

32 Claims, No Drawings

THERMAL INK JET INK COMPOSITION

CROSS REFERENCE TO RELATED APPLICATIONS

This application is a Continuation-In-Part of U.S. application Ser. No. 12/059,753 filed Mar. 31, 2008, and incorporated herein by reference in its entirety

BACKGROUND OF THE INVENTION

Thermal ink jet (TIJ) print heads produce ink droplets from thermal vaporization of the ink solvent. In the jetting process, a resistor is heated rapidly to produce a vapor bubble which subsequently ejects a droplet from the orifice. This process is extremely efficient and reproducible. Modern TIJ print heads for industrial graphics applications are capable of generating uniform drops of 4 pL or smaller in volume at frequencies of 36 kHz or greater. Typical commercial TIJ devices are specifically designed to vaporize water or solvents that have physical properties close to those of water (e.g. high boiling point, large heat capacity, low molecular weight).

Although TIJ printing systems have been available for over 30 years, nearly all of the commercial inks available for thermal ink jet systems have been water-based, i.e. they contain more than 50% water. Such aqueous inks have one or more drawbacks such as long ink dry times or poor adhesion to semi-porous or non-porous substrates.

There is a desire for inks with attractive performance characteristics such as short dry times, long decap times and good adhesion when using a TIJ system to print onto semi-porous and non-porous substrates.

BRIEF SUMMARY OF THE INVENTION

The disclosure provides a thermal ink jet ink composition including one or more volatile organic solvents, one or more humectants, one or more binder resins, and one or more dyes. The one or more volatile organic solvents are selected from $C_1$-$C_4$ alcohols, $C_3$-$C_6$ ketones, and mixtures thereof. The humectants are present in an amount not more than 30% by weight of the ink jet ink composition. The thermal ink jet ink composition is suitable for use in a thermal ink jet printer.

In another aspect, the disclosure provides a printing system including a thermal ink jet cartridge containing a thermal ink jet ink composition. A thermal ink jet print head is adapted to direct a stream of droplets of the thermal ink jet ink composition to a substrate. The thermal ink jet ink composition has a decap time of at least 15 seconds and a dry time of less than 5 seconds on a non-porous substrate when used in the thermal ink jet print head.

The disclosure also provides a thermal ink jet cartridge including a thermal ink jet ink composition.

The thermal ink jet ink composition of the invention has one or more of the following features: short dry times, long decap times, good adhesion to substrates, safety, and material compatibility. Decap time at the droplet level is the length of time that a nozzle can remain dormant and then be fired again without any significant reduction in droplet velocity, reduction in droplet weight, or change in droplet direction. Decap time at the print level is measured as the length of time that a print head can remain dormant and then be fired again without any significant degradation of print (i.e., it is the maximum wait time between printing events with no significant change to the printed image after the wait). Fluids with good material compatibility are defined as those which do not degrade the ability of the TIJ cartridge to fire for some reasonable length of time. The thermal ink jet ink composition does not require heat assist (e.g., thermal driers) when printed on semi-porous and non-porous substrates.

DETAILED DESCRIPTION OF THE INVENTION

The invention provides a thermal ink jet ink composition comprising one or more volatile organic solvents, one or more humectants, one or more binder resins, and one or more colorants.

In accordance with an embodiment, the volatile organic solvents are selected from $C_1$-$C_4$ alcohols, $C_3$-$C_6$ ketones, $C_3$-$C_6$ esters, $C_4$-$C_8$ ethers, and mixtures thereof. The volatile organic solvents are preferably selected from $C_1$-$C_4$ alcohols, $C_3$-$C_6$ ketones, and mixtures thereof. Examples of $C_1$-$C_4$ alcohols include methanol, ethanol, 1-propanol, and 2-propanol. Examples of $C_3$-$C_6$ ketones include acetone, methyl ethyl ketone, methyl n-propyl ketone, and cyclohexanone. Examples of $C_4$-$C_8$ ethers include diethyl ether, dipropyl ether, dibutyl ether and tetrahydrofuran. Examples of $C_3$-$C_6$ esters include methyl acetate, ethyl acetate and n-butyl acetate. The organic solvents, particularly alcohols, ketones, and esters, have an attractive feature that they penetrate semi- and some non-porous substrate surfaces more readily and evaporate more quickly than water based inks, thus reducing dry time and improving adhesion.

In particular embodiments the thermal ink jet ink compositions includes, as the volatile organic solvent(s), methyl ethyl ketone, a blend of methyl ethyl ketone and methanol, or a blend of methyl ethyl ketone and ethanol as the primary jetting solvent. Many commercial inks for non-thermal ink jet applications use methyl ethyl ketone due to its strong solvation properties, preferred surface tension, and fast dry times. The solvent strength of methyl ethyl ketone gives methyl ethyl ketone-based inks access to a wide selection of colorants, resins, co-solvents and additives that are unavailable to weaker solvents, such as alcohols.

The solvent-based thermal ink jet inks disclosed herein preferably have viscosities below 3 cPs, preferably below 2 cPs, at 25° C. Many methyl ethyl ketone-based inks that are optimized for other ink jet technologies (such as continuous ink jet (CIJ) or drop-on-demand (DOD)) jet poorly or not at all in thermal ink jet cartridges. Existing CIJ inks have high resin and/or dye content (and overall high solids), leading to relatively high viscosities of typically 2 to 5 cPs at 25° C. High molecular weight polymers may also impede thermal ink jet jetting performance when used at levels that are typically found in commercial CIJ inks. Kogation (excessive material buildup on thermal ink jet firing resistors that leads to reduced drop volume and velocity) is also a potential problem for high solids and high resin MW systems. Careful screening of materials for potential kogation is an important step in thermal ink jet ink evaluation. Existing CIJ inks, if they can be jetted in thermal ink jet systems, have very short decap times (<5 sec), which makes them commercially infeasible. Inks with very short decap times can create unrecoverable nozzle blockages in thermal ink jet systems and thus lead to premature cartridge failure before target delivered ink volume and expected end of life is reached. Thus, specific materials and formulation levels are required to create solvent-based thermal ink jet inks that jet well, have good long term reliability, have manageable decap times, do not cause resistor kogation while maintaining short dry times, crisp print quality and excellent adhesive performance on non-porous substrates.

The total amount of the one or more volatile organic solvents can be in any suitable amount, for example, in an amount 50% or more, about 60% or more, about 70% or more, about 80% or more, or about 90% or more by weight of the ink jet ink composition. In an embodiment, the one or more volatile organic solvents can be present in an amount from 50 to about 99%, preferably from about 60 to about 90%, and more preferably from about 70 to about 80% of the ink jet ink composition. The thermal ink jet ink composition can optionally include water in a suitable amount, e.g., up to 49% by weight, up to about 25% by weight, or up to about 10% by weight, up to about 5% by weight, or up to about 2% by weight of the ink jet ink composition.

In an embodiment, the one or more volatile organic solvents includes methyl ethyl ketone and one or both of ethanol and methanol. The methyl ethyl ketone may be present in an amount between 10% and 85% by weight, preferably between 25% to 75% by weight, and more preferably between 40% and 70% of the ink jet ink composition. The methanol may be present in an amount between 10% and 70% by weight, preferably between 20% and 50% by weight, and more preferably between 25% and 40% by weight of the ink jet ink composition. The ethanol may be present in an amount between 10% and 70% by weight, preferably between 20% and 50% by weight, and more preferably between 25% and 40% by weight of the ink jet ink composition. The ethanol, if present, is preferably present in an amount less than 70% be weight, more preferably less than 60% by weight of the ink jet ink composition.

The thermal ink jet ink composition can include any suitable colorant or colorants, which may be dye or pigment. In an embodiment, one or more dyes are employed as the colorant, wherein the one or more dyes are selected from the group consisting of acid dyes, basic dyes, solvent dyes, disperse dyes, mordant dyes, reactive dyes and any combination thereof. Examples of solvent dyes include naphthol dyes, azo dyes, metal complex dyes, anthraquinone dyes, quinoimine dyes, indigoid dyes, benzoquinone dyes, carbonium dyes, naphthoquinone dyes, naphthalimide dyes, phthalocyanine dyes, nigrosine dyes and perylene dyes.

For example, the thermal ink jet ink composition can include one or more dyes selected from the group consisting of C.I. Solvent Yellow 19, C.I. Solvent Yellow 21, C.I. Solvent Yellow 61, C.I. Solvent Yellow 80, C.I. Solvent Orange 1, C.I. Orange 37, C.I. Orange 40, C.I. Solvent Orange 54, C.I. Solvent Orange 63, C.I. Solvent Red 8, Solvent Red 49, C.I. Solvent Red 81, C.I. Solvent Red 82, C.I. Solvent Red 84, C.I. Solvent Red 100, C.I. Acid Red 92, C. I. Reactive Red 31, Orient Pink 312, C.I. Basic Violet 3, C.I. Basic Violet 4, C.I. Solvent Violet 8, C.I. Solvent Violet 21, C.I. Solvent Blue 2, C.I. Solvent Blue 5, C.I. Solvent Blue 11, C.I. Solvent Blue 25, C.I. Solvent Blue 36, C.I. Solvent Blue 38, C.I. Solvent Blue 55; C.I. Solvent Blue 70, C.I. Solvent Green 3, C.I. Solvent Black 3, C.I. Solvent Black 5, C.I. Solvent Black 7, C.I. Solvent Black 22, C.I. Solvent Black 26, C.I. Solvent Black 27, C.I. Solvent Black 29 (VALIFAST BLACK 3808 or ORASOL BLACK RLI™), C.I. Acid Black 123, C.I. Solvent Black 48 (MORFAST BLACK 101™), C.I. Oil Blue 613, and any combination thereof, and preferably one or more dyes selected from the group consisting of C.I. Solvent Black 29 (ORASOL BLACK RLI™), C.I. Solvent Black 27, C.I. Solvent Black 48, C.I. Solvent Black 3 (Oil Black 860), C.I. Basic Violet 3, C.I. Solvent Blue 38, C.I. Solvent Blue 70, C.I. Oil Blue 613, C.I. Solvent Red 49 (ORIENT PINK™ 312), C.I. Solvent Orange 54 (VALIFAST ORANGE™ 3210), and any combination thereof.

Any suitable pigment can be used, for example, one or more pigments selected from the group consisting of phthalocyanine blue, carbon black, mars black, quinacridone magenta, ivory black, prussian blue, cobalt blue, ultramarine blue, manganese blue, cerulean blue, indathrone blue, chromium oxide, iron oxides, viridian, cobalt green, terre verte, nickel azo yellow, light green oxide, phthalocyanine green-chlorinated copper phthalocyanine, burnt sienna, perinone orange, irgazin orange, quinacridone magenta, cobalt violet, ultramarine violet, manganese violet, dioxazine violet, zinc white, titanium white, flake white, aluminum hydrate, blanc fixe, china clay, lithophone, arylide yellow G, arylide yellow 10G, barium chromate, chrome yellow, chrome lemon, zinc yellow, cadmium yellow, aureolin, naples yellow, nickel titanate, arylide yellow GX, isoindolinone yellow, flavanthrone yellow, yellow ochre, chromophthal yellow 8GN, toluidine red, quinacridone red, permanent crimson, rose madder, alizarin crimson, vermilion, cadmium red, permanent red FRG, brominated anthranthrone, naphthol carbamide, perylene red, quinacridone red, chromophthal red BRN, chromophthal scarlet R, aluminum oxide, bismuth oxide, cadmium oxide, chromium oxide, cobalt oxide, copper oxide, iridium oxide, lead oxide, manganese oxide, nickel oxide, rutile, silicon oxide, silver oxide, tin oxide, titanium oxide, vanadium oxide, zinc oxide, zirconium oxide, and any combination thereof.

In embodiments, the pigments are selected from the group consisting of azo pigments, phthalocyanine pigments, quinacridone pigments, dioxazine pigments, isoindolinone pigments, metal oxide pigments, carbon black, and any combination thereof.

The pigments can have any suitable particle size, for example, from about 0.005 micron to about 15 microns, preferably from about 0.005 to about 1 micron, and more preferably from about 0.01 to about 0.3 micron.

In any of the embodiments above, the colorant, dye or pigment, can be present in an amount from about 0.01% to about 10%, preferably from about 0.5% to about 7%, and more preferably from about 1% to about 5% by weight of the ink jet ink composition.

In any of the embodiments above, any suitable humectant can be used. Humectants are additives which maintain a wet environment in the vicinity of the ink jet nozzle during the evaporation process, thus extending the decap time. Preferably, humectants have a boiling point greater than 150° C., greater than 200° C., or greater than 250° C., and/or a relative evaporation rate less than 1.0, less than 0.9, less than 0.7, less than 0.4, less than 0.1, or less than 0.01. The humectants typically are solvents having one or more polar functional groups such as hydroxyl, ether, amide, ester, ketone, and carbonate, for example, two functional groups, which may be the same or different, such as two hydroxyl groups or one hydroxyl group and one ether group. In an embodiment, the one or more humectants are selected from the group consisting of polyol, glycol ether, glycol ether acetates, diacetone alcohol, 2-pyrrolidinone, N-methylpyrrolidinone, ethyl lactate, butyl lactate, propylene carbonate, 1,3-dimethyl-2-imidazolidindione, and alkyl esters, and any combination thereof.

For example, the polyol is selected from the group consisting of polyethylene glycol, polypropylene glycol, poly(ethylene-co-propylene glycol), trimethylol propane, ethylene glycol, glycerin, diethylene glycol, triethylene glycol, tripropylene glycol, tetraethylene glycol, pentaethylene glycol, 1,2-propylene glycol, 1,3-propanediol, butylene glycol, triethylene glycol, 1,2,6-hexanetriol, thiodiglycol, hexylene glycol, bis-2-hydroxyethyl ether, 1,4-butanediol, 1,2-butenediol, 1,4-butenediol, 1,3-butenediol, 1,5-pentanediol, 2,4-pentanediol, 2,4-heptanediol, 1,8-octanediol, 1,10-decanediol, 1,12-dodecanediol, 1,4-cyclohexanediol, 1,4-cyclohexanedimethanol, 1,2-bis(hydroxymethyl)

cyclohexane, 1,2-bis(hydroxyethyl)-cyclohexane, 3-methyl-1,5-pentanediol, 2,2,4-trimethyl-1,3-pentanediol, neopentyl glycol, pentaerythritol, sorbitol, mannitol, and any combination thereof, and preferably the polyol is selected from the group consisting of polyethylene glycol, trimethylol propane, ethylene glycol, propylene glycol, glycerin, diethylene glycol, tripropylene glycol, and any combination thereof, A preferred humectant is glycol ether, for example, a glycol ether selected from the group consisting of ethylene glycol monomethyl ether, ethylene glycol monoethyl ether, propylene glycol monomethyl ether, tripropylene glycol monomethyl ether, ethylene glycol monobutyl ether, diethylene glycol monomethyl ether, diethylene glycol monoethyl ether, propylene glycol n-propyl ether, propylene glycol t-butyl ether, propylene glycol n-butyl ether, dipropylene glycol methyl ether, dipropylene glycol n-propyl ether, dipropylene glycol t-butyl ether, dipropylene glycol n-butyl ether, tripropylene glycol n-propyl ether, tripropylene glycol t-butyl ether, tripropylene glycol n-butyl ether, ethyl cellosolve, methyl cellosolve, polyethylene glycol monomethyl ether, polypropylene glycol monomethyl ether, methoxytriglycol, ethoxytriglycol, butoxytriglycol, 1-butoxyethoxy-2-propanol, and any combination thereof, and preferably, the glycol ether is selected from the group consisting of ethylene glycol monomethyl ether, ethylene glycol monoethyl ether, propylene glycol monomethyl ether, propylene glycol monopropyl ether, tripropylene glycol monomethyl ether, ethylene glycol monobutyl ether, diethylene glycol monomethyl ether, diethylene glycol monoethyl ether, and any combination thereof. In certain embodiments, propylene glycol monopropyl ether is a preferred humectant. In other embodiments, propylene glycol monomethyl ether is a preferred humectant.

Humectants contribute, at least in part, to a feature of the thermal ink jet ink composition. Thus, humectants can lengthen decap times; however, excessive amounts of humectants could increase the dry time of the ink jet ink composition. In any of the embodiments, the one or more humectants can be present in any suitable amount, for example, in an amount about 30% by weight or less, about 25% by weight or less, about 20% by weight or less, about 15% by weight or less, or about 10% by weight or less. In an embodiment, the one or more humectants are present in an amount at least about 1% by weight, at least about 2% by weight, at least about 5% by weight, or at least about 10% by weight. In an embodiment, the one or more humectants can be present in an amount from about 1% to about 30%, preferably from about 5% to about 25%, and more preferably from about 10% to about 20% of the ink jet ink composition.

As discussed, the thermal ink jet ink composition includes one or more binder resins. Any suitable binder resin, soluble or dispersible, can be employed, preferably a solvent soluble binder resin. In an embodiment, the thermal ink jet ink composition includes one or more binder resins selected from the group consisting of polyamide resins, polyurethane resins, rosin ester resins, acrylic resins, polyvinyl butyral resins, polyesters, phenolic resins, vinyl resins, polystyrene/polyacrylate copolymers, cellulose ethers, cellulose nitrate resins, polymaleic anhydrides, acetal polymers, polystyrene/polybutadiene copolymers, polystyrene/polymethacrylate copolymers, sulfonated polyesters, aldehyde resins, polyhydroxystyrene resins and polyketone resins, and any combination thereof, and preferably one or more binder resins selected from the group consisting of cellulose nitrate resins, polyamide resins, rosin ester resins, acrylic resins, polyvinyl butyral resins, vinyl resins, polyhydroxystyrene resins and any combination thereof. An example of a suitable polyamide resin is ARIZONA 201-150™ available from Arizona Chemical Company, Jacksonville, Fla., or COGNIS VERSAMID 756™, available from Cognis GmbH, Monheim am Rhein, Germany, both of which are alcohol-soluble polyamide resins. Examples of wood rosin ester resins include UNIREZ™ 8115, available as a 40% solution in ethanol from Penn Color, Doylestown, Pa., which is a hydrogenated wood rosin ester, and STAYBELITE™ ESTER 10, available from Chem Central Corporation. Examples of cellulose nitrate resins are NOBEL™ DLX 3-5 or NOBEL™ DHX 5-8, available from Nobel Enterprises. Examples of polyvinyl butyral resins are PIOLOFORM™ BN18, available from Wacker Chemie AG, and MOWITAL™ B20H available from Kuraray America, Inc. Examples of acrylic and styrene/acrylic resins are Joncryl 611, 682, and 586 (available from BASF, USA) and Paraloid B-66 and B-72 (available from Dow Chemical, USA). Examples of vinyl resins include UCAR VYHH, VMCH, YMCA, and VAGF (available from Dow Chemical Company, USA) and Vinnol E15/45, H14/36, E15/45M, and E16/40A (available from Wacker Chemie AG, Germany). Examples of polyhydroxystyrene resins include poly(p-hydroxy styrene) from DuPont.

The polymeric binder resin can be present in any suitable amount, for example, in an amount from about 0.1 to about 30%, preferably from about 0.2 to about 15%, and more preferably from about 0.3 to about 8% of the ink jet ink composition. The polymeric binder resin may have a weight average molecular weight ($M_w$) of less than 250,000, preferably less than 100,000, and more preferably less than 50,000.

In a particular embodiment of the thermal ink jet ink composition, the volatile organic solvent or solvents can be present in an amount from about 50% to about 95% by weight, the colorant(s) (dyes, pigments, or a combination thereof), can be present in amount from about 1% to about 8% by weight, the glycol ether can be present in an amount from about 3% to 30% by weight, and the binder resin can be present in an amount from about 1% to about 15% by weight of the ink jet ink composition.

The thermal ink jet ink composition can further include one or more additives such as surfactants, and plasticizers. Preferably, a polymeric surfactant is employed. Examples of surfactants include modified polysiloxanes, alkyl modified polyoxyalkyleneamines, alkyl modified propoxylated (poly(oxypropylene)) diamines, alkyl ether amines, nonyl phenol ethoxylates, ethoxylated fatty amines, fluorinated organic acid diethanolamine salts, alkoxylated ethylenediamines, alkyl modified polyethylene oxides, alkyl modified polyalkyleneoxides, alkyl phosphate ethoxylate mixtures, polyoxyalkylene derivatives of propylene glycol, and polyoxyethylated fatty alcohols. A specific example of a suitable polymeric surfactant, e.g., Silicone Fluid SF-69, available from General Electric, which is a blend of silanols and cyclic silicones. Another specific example of surfactant is SILWET L7622™ which is a siloxane polyalkyleneoxide copolymer (Momentive Performance Chemicals, USA).

In any of the embodiments, the surfactants can be present in an amount from about 0.01 to about 2.0%, preferably from about 0.02 to about 1%, and more preferably from about 0.03 to about 0.5% of the ink jet ink composition.

Examples of suitable plasticizers include phthalate plasticizers, e.g., alkyl benzyl phthalates, butyl benzyl phthalate, dioctyl phthalate, diisobutyl phthalate, dicyclohexyl phthalate, diethyl phthalate, dimethyl isophthalate, dibutyl phthalate, and dimethyl phthalate, esters such as di-(2-ethylhexy)-adipate, diisobutyl adipate, glycerol tribenzoate, sucrose benzoate, dibutyl sebacate, dibutyl maleate, polypropylene glycol dibenzoate, neopentyl glycol dibenzoate, dibutyl sebacate, and tri-n-hexyltrimellitate, phosphates such as tricresyl phosphate, dibutyl phosphate, polyurethanes, and sulfonamide plasticizers such as Plasticizer 8, available from Monsanto Co., St. Louis, Mo., which is n-ethyl o,p-toluene sulfonamide.

In certain embodiments, the plasticizer can be present in an amount from about 0.1 to about 5.0%, preferably from about 0.2 to about 3.0%, and more preferably from about 0.25 to about 2.0% of the ink jet ink composition.

The thermal ink jet ink composition may include additional ingredients such as bactericides, fungicides, algicides, sequestering agents, buffering agents, corrosion inhibitors, antioxidants, light stabilizers, anti-curl agents, thickeners, dispersing agents, conductive salts, and other agents known in the relevant art. In an embodiment, the ink composition is free or substantially free of antioxidants.

The thermal ink jet ink composition has one or more attractive features such as short unassisted dry times of printed alphanumeric or graphic images, long decap times, good adhesion to semi-porous and non-porous substrates, and safety or material compatibility with one or more components of a thermal ink jet printer. In particular, it is desirable that the thermal ink jet ink composition have both a short dry time and a long decap time. For example, embodiments of the thermal ink jet ink composition have a dry time of about 10 seconds or less, such as 7 seconds or less, 5 seconds or less, 4 seconds or less, or 2 seconds or less, on non-porous substrates under ambient conditions. Non-porous substrates include materials such as plastics, metals, glass, and glossy paper. On porous substrates, the dry times are shorter than in semi- or non-porous substrates. For example, embodiments of the thermal ink jet ink composition have a dry time of about 1 second on porous substrates and less than about 5 seconds, preferably less than about 2 seconds, and more preferably less than about 1 second on semi-porous substrates. The thermal ink jet ink composition preferably has a decap time of at least 10 seconds, more preferably at least 15 seconds, at least 30 seconds or at least 45 seconds, and most preferably at least 60 seconds, when used in a thermal ink jet print head. In a preferred embodiment, the thermal ink jet ink composition has a decap time of at least 15 seconds and a dry time of less than 5 seconds on non-porous substrates when used in a thermal ink jet print head. Decap time at the microscopic (i.e. droplet) level can be described as the length of time that a nozzle can remain dormant and then be fired again without any significant reduction in droplet velocity, reduction in droplet weight, or change in droplet direction. Decap time at the macroscopic (i.e. print) level is measured as the length of time that a print head can remain dormant and then be fired again without any significant degradation of print (i.e., it is the maximum wait time between printing events with no significant change to the printed image after the wait).

The thermal ink jet ink composition can have any suitable viscosity or surface tension. In embodiments of the invention, the thermal ink jet ink composition has a viscosity of less than about 10 cPs, preferably less than about 5 cPs, more preferably less than about 3 cPs, and most preferably less than about 2 cPs, for example, a viscosity from about 1 to 4 or from about 1 to about 3 cPs at 25° C. In embodiments of the invention, the thermal ink jet ink composition has a surface tension from about 20 to about 50 mN/m, from about 21 to about 40 mN/m, or from about 22 to about 30 mN/m at 25° C. The solids content of the thermal inkjet ink composition may be less than 20% by weight, and is preferably less than 15% by weight.

The thermal ink jet ink composition can be prepared by any suitable method. For example, the chosen ingredients can be combined and mixed with adequate stirring and the resulting fluid filtered to remove any undissolved impurities.

The thermal ink jet ink composition may used in any suitable thermal ink jet cartridge. The thermal ink jet cartridge is preferably fashioned from materials that are resistant to the solvents used in the thermal ink jet ink composition. A suitable thermal ink jet cartridge is disclosed in US Patent Application Publication 20090303299A1, entitled "INK CONTAINMENT SYSTEM AND INK LEVEL SENSING SYSTEM FOR AN INKJET CARTRIDGE," with a publication date of Dec. 10, 2009, the contents of which are hereby incorporated by reference.

The present disclosure further provides a method for printing images on a substrate in a thermal ink jet printer comprising directing a stream of droplets of any of the embodiments of the thermal ink jet ink composition to a substrate and allowing the ink droplets to dry, thereby printing images on a substrate. Any suitable substrate can be printed in accordance with the invention. Examples of suitable substrates include porous substrates such as uncoated paper, semi-porous substrates such as aqueous coated paper, clay coated paper, silica coated paper, UV overcoated paper, polymer overcoated paper, and varnish overcoated paper, and non-porous substrates such as hard plastics, polymer films, metals, glass, coated foils, polymer laminates, foil laminates, and ceramics. The paper substrates can be thin sheets of paper, rolls of paper, or cardboard. Plastics, metals, glass, foils, laminates and ceramic substrates can be in any suitable form such as in the form of bottles or containers, plates, rods, cylinders, etc.

Examples of polymer coating include a coating of polystyrene, polyvinyl alcohol, polyacryate, polymethacrylate, polystryrene or polyvinyl chloride. Examples of polymer film substrates include polyvinyl butyrals, polyolefins, polyvinyl chloride, polyethylene terephthalate, PETG, PETE, polybutylene terephthalate (PBT), polyester, polycarbonate, acrylonitrile-butadiene-styrene (ABS) copolymer, polyvinyl fluoride polymer, polyamides, polyimides, and cellulose. Plastics can be treated plastics (e.g. chemical etch, corona discharge, flame plasma, etc.) or untreated plastics. Examples of metals include aluminum, copper, stainless steel, and metal alloys. Examples of ceramics include oxides, nitrides, and carbides of metals.

The following examples further illustrate the invention but, of course, should not be construed as in any way limiting its scope.

EXAMPLE 1

This example illustrates embodiments of the thermal ink jet ink composition. The materials employed in preparing the ink jet ink composition, their amounts, and the formulation numbers are set forth in Table 1 below.

TABLE 1

| Material | 2520 | 2538 | 5521 | 5678 | 5745 | 5750 | 5762 | 5798 | 5815 | 5817 | 5818 |
|---|---|---|---|---|---|---|---|---|---|---|---|
| ethanol | | | | 86.55 | 45.35 | 45.49 | 25.00 | 85.49 | 41.50 | 86.00 | 86.00 |
| isopropanol | 73.45 | | | | | | | | | | |
| 1-propanol | | 79.00 | | | | | | | | | |

TABLE 1-continued

| Material | 2520 | 2538 | 5521 | 5678 | 5745 | 5750 | 5762 | 5798 | 5815 | 5817 | 5818 |
|---|---|---|---|---|---|---|---|---|---|---|---|
| 1-butanol | | | 82.28 | | | | | | | | |
| methanol | | | | | | | | | 41.00 | | |
| glycol ether PM | 10.50 | 5.00 | 3.15 | 3.50 | 45.10 | 40.00 | 50.00 | 10.00 | 10.00 | 10.00 | 10.00 |
| Valifast Black 3808 | 4.00 | 4.00 | | | | | 4.00 | 4.00 | 4.00 | 4.00 | 4.00 |
| Orasol Black RLI | | | | | 5.00 | | | | | | |
| Valifast Orange 3210 | | | | 1.06 | 1.00 | 1.00 | 1.00 | | | | |
| Orient Oil Pink 312 | | | | 1.38 | 1.40 | | | | | | |
| 40% Unirez 8115 in EtOH | 12.00 | 12.00 | 12.08 | | | | | | | | |
| 20% Arizona 201-150 in EtOH | | | | | | | | 20.00 | | | |
| 40% Cognis Versamid 756 in EtOH | | | | 7.50 | | | | | | | |
| Nobel DLX 3-5 | | | | | | | | | 3.00 | | |
| Piloform LL 4140 | | | | | 3.00 | | | | | | |
| Joncryl 682 | | | | | | 6.00 | | | | | |
| K-Plast 1022 | | | | | | 3.00 | | | | | |
| Silicone fluid SF69 | 0.05 | | 0.05 | 0.05 | 0.05 | 0.01 | | 0.01 | 0.01 | 0.01 | 0.01 |
| Plasticizer 8 | | | | | | 0.50 | 0.50 | 1.00 | 0.50 | 0.50 | |

EXAMPLE 2

This Example illustrates the ink dry times of embodiments of the thermal ink jet ink composition.

TABLE 2

| Formulation Number | Substrate | Type | Unassisted Dry Time, sec |
|---|---|---|---|
| 5678 | Clay Coat | semi-porous | 1 |
| | Aqueous Coat | semi-porous | 2 |
| | Varnish Coat | semi-porous | 2 |
| | UV Coat | semi-porous | 3 |
| | HDPE | non-porous | 1 |
| | Polypropylene | non-porous | 2 |
| | PET | non-porous | 1 |
| | PVC | non-porous | 2 |
| | Glass | non-porous | 2 |
| | Aluminum | non-porous | 1 |
| 5750 | Clay Coat | semi-porous | 1 |
| | Aqueous Coat | semi-porous | 1 |
| | Varnish Coat | semi-porous | 1 |
| | UV Coat | semi-porous | 2 |
| | HDPE | non-porous | 2 |
| | Polypropylene | non-porous | 3 |
| | PET | non-porous | 2 |
| | PVC | non-porous | 2 |
| | Glass | non-porous | 2 |
| | Aluminum | non-porous | 2 |
| 5798 | Clay Coat | semi-porous | 1 |
| | Aqueous Coat | semi-porous | 1 |
| | Varnish Coat | semi-porous | 1 |
| | UV Coat | semi-porous | 2 |
| | HDPE | non-porous | 2 |
| | Polypropylene | non-porous | 3 |
| | PET | non-porous | 2 |
| | PVC | non-porous | 2 |
| | Glass | non-porous | 1 |
| | Aluminum | non-porous | 1 |

From Table 2 it can be seen that the inventive thermal ink jet ink compositions provide acceptable dry times on a variety of semi-porous and non-porous surfaces.

EXAMPLE 3

This Example illustrates some of the properties of embodiments of the ink jet ink composition.

TABLE 3

| Formulation No. | Viscosity (cPs) | Surface Tension (mN/m) |
|---|---|---|
| 5521 | 3.42 | 24.1 |
| 5678 | 1.71 | 22.6 |
| 5745 | 3.10 | 24.4 |
| 5750 | 3.28 | 25.0 |
| 2520 | 3.03 | 22.0 |
| 5798 | 1.50 | 22.6 |
| 5815 | 2.31 | 20.2 |

EXAMPLE 4

This Example illustrates the adhesion of the printed images obtained from embodiments of the ink jet ink composition. The ink jet ink composition Nos. 2520, 5745, 5750 and 5815 produce images on clay coat substrates having aqueous overcoat, UV overcoat, or varnish overcoat, as well as on polyethylene, polypropylene, polystyrene, polyvinyl chloride, polyethylene terephthalate, glass and aluminum substrates, that pass a 1 minute rub resistance test as well as a 24 hour scratch adhesion test

EXAMPLE 5

This example illustrates embodiments of the thermal ink jet ink composition. The materials employed in preparing the ink jet ink composition, their amounts, and the formulation numbers are set forth in Table 4 below.

TABLE 4

| Material | 11516 | 11624 | 11720 | 11861 | 11900 | 11903 | 12001 | 12110 |
|---|---|---|---|---|---|---|---|---|
| ethanol SDA-3C | | | | | | | 25 | |
| methanol | 42 | 40 | | 25 | | | | |
| MEK | 42 | 40 | 63.95 | 48.35 | 68.6 | 73.35 | 48.35 | 70.6 |
| propasol P | | | 30 | 10 | 10 | 10 | 10 | 15 |

TABLE 4-continued

| Material | 11516 | 11624 | 11720 | 11861 | 11900 | 11903 | 12001 | 12110 |
|---|---|---|---|---|---|---|---|---|
| glycol ether PM | 10 | 10 |  | 10 | 10 | 10 | 10 |  |
| diacetone alcohol |  |  |  |  |  |  |  | 6.25 |
| Orasol Black RLI |  |  |  | 3.25 | 4 | 3.25 | 3.25 | 3.25 |
| Valifast Black 3808 | 4 |  | 4 |  |  |  |  |  |
| Valifast Orange 3210 |  |  |  | 0.75 | 0.75 | 0.75 | 0.75 | 0.75 |
| Solvent Black 27 |  | 10 |  |  |  |  |  |  |
| Super Ester A-75 |  |  |  |  | 3 |  |  | 1.5 |
| Staybelite Ester 10 |  |  |  |  |  |  |  |  |
| Nobel DHX 3-5 |  |  |  |  |  |  | 2 |  |
| Nobel DHX 3-4 |  |  |  | 2 |  | 2 |  | 1.5 |
| Nobel DLX 3-5 |  |  | 1.25 |  |  |  |  |  |
| Pioloform LL4140 | 1.5 |  |  |  |  |  |  |  |
| Vinyl Resin VMCH |  |  |  |  |  |  |  |  |
| Poly(4-hydroxy styrene) |  |  |  |  | 3 |  |  |  |
| Silicone fluid SF69 | 0.01 | 0.01 | 0.05 | 0.05 | 0.05 | 0.05 | 0.05 | 0.05 |
| Santicizer 160 |  |  |  |  |  |  |  |  |
| Plasticizer 8 | 0.5 |  | 0.5 | 0.5 | 0.5 | 0.5 | 0.5 | 1 |
| Silwet 7622 |  |  | 0.25 | 0.1 | 0.1 | 0.1 | 0.1 | 0.1 |

Table 5 illustrates the dry time, decap time, and rub and scratch performance for the ink formulations in Table 4 across a range of semi-porous and non-porous substrates.

TABLE 5

|  | 11516 | 11624 | 11720 | 11861 | 11900 | 11903 | 12001 | 12110 |
|---|---|---|---|---|---|---|---|---|
| dry time (sec) | <5 | <5 | >5 | >5 | <5 | <5 | <5 | >5 |
| decap time (sec, 80% recovery) | 45 | 60 | 22 | 30 | 60 | 30 | 30 | 60 |
| 1 min rub (120 max score) | 96 | 52 | 86 | 97 | 100 | 98 | 104 | 110 |
| 24 hr scratch (120 max score) | 48 | 55 | 91 | 79 | 88 | 97 | 90 | 91 |

From Table 5 it can be seen that the inventive thermal ink jet ink compositions provide acceptable decap times and rub and scratch properties.

Comparative Example

This example illustrates comparative examples of conventional continuous ink jet formulations. The component materials of the continuous ink jet ink compositions are set forth in Table 6 below.

TABLE 6

| Component | Comparative Example A | Comparative Example B | Comparative Example C |
|---|---|---|---|
| MEK | 32 | 81 | 71 |
| methanol | 31 |  |  |
| ethanol |  |  | 2 |
| NMP | 2 |  |  |
| GE-PM | 5 |  |  |
| other | 2 |  |  |
| acrylic resin | 17 |  | 5 |
| wood rosin ester | 2 | 10 |  |
| vinyl resin |  | 3 |  |
| silicone resin |  |  | 3 |
| silane/silicone | 1 | 1 | 2 |
| solvent black 29 dye |  | 4 | 6 |
| triarylmethane dye | 2 |  |  |
| aniline dye | 6 |  |  |
| plasticizer |  | 1 | 11 |

The ink compositions of each of the Comparative Examples were provided in a conventional thermal ink jet cartridge to attempt to jet the inks. All of the CIJ ink compositions in Table 6 jetted very poorly or not at all in the thermal ink jet cartridge. Thus, it can be seen that conventional continuous ink jet ink compositions are not suitable for use in thermal ink jet cartridges.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A thermal ink jet ink composition comprising:
   one or more volatile organic solvents, wherein the one or more volatile organic solvents are selected from $C_1$-$C_4$ alcohols, $C_3$-$C_6$ ketones, and mixtures thereof;
   one or more humectants, wherein the humectants are present in an amount not more than 30% by weight of the ink jet ink composition;
   one or more binder resins; and
   one or more dyes, wherein the thermal ink jet ink composition is suitable for use in a thermal ink jet printer and wherein the thermal ink jet ink composition has a decap time of at least 15 seconds when used in a thermal ink jet print head.

2. The thermal ink jet ink composition of claim 1, wherein the thermal ink jet ink composition has a dry time of less than 5 seconds on a non-porous substrate when used in a thermal ink jet print head.

3. The thermal ink jet ink composition of claim 1, wherein the thermal ink jet ink composition has a decap time of at least 60 seconds and a dry time of less than 5 seconds on a non-porous substrate when used in a thermal ink jet print head.

4. The thermal ink jet ink composition of claim 1, wherein the one or more volatile organic solvents are selected from methanol, ethanol, 1-propanol, acetone, methyl ethyl ketone, methyl n-propyl ketone, ethyl acetate, propyl acetate, butyl acetate, and mixtures thereof.

5. The thermal ink jet ink composition of claim 2, wherein the one or more volatile organic solvents are selected from methanol, ethanol, methyl ethyl ketone, and mixtures, thereof.

6. The thermal ink jet ink composition of claim 5, wherein the one or more volatile organic solvents comprises methyl ethyl ketone.

7. The thermal ink jet ink composition of claim 6 wherein the methyl ethyl ketone is present in an amount between 40% and 90% by weight of the ink jet ink composition.

8. The thermal ink jet ink composition of claim 5, wherein the one or more volatile organic solvents comprises methanol.

9. The thermal ink jet ink composition of claim 8 wherein the methanol is present in an amount between 20% and 50% by weight of the ink jet ink composition.

10. The thermal ink jet ink composition of claim 5, wherein the one or more volatile organic solvents comprises ethanol.

11. The thermal ink jet ink composition of claim 10 wherein the ethanol is present in an amount between 20% and 50% by weight of the ink jet ink composition.

12. The thermal ink jet ink composition of claim 1, wherein the one or more volatile organic solvents comprises methyl ethyl ketone and one or both of ethanol and methanol.

13. The thermal ink jet ink composition of claim 1, wherein the one or more humectants are selected from the group consisting of polyol, glycol ether, glycol ether acetate, diacetone alcohol, 2-pyrrolidinone, N-methylpyrrolidinone, ethyl lactate, butyl lactate, 1,3-dimethyl-2-imidazolidindione, propylene carbonate, alkyl esters, and mixtures thereof.

14. The thermal ink jet ink composition of claim 1, wherein the one or more binder resins are selected from the group consisting of polyamide resins, polyurethane resins, rosin ester resins, acrylic resins, polyvinyl butyral resins, polyesters, polyurethanes, phenolic resins, vinyl resins, ethylene vinyl acetate resins, polystyrene/polyacrylate copolymers, cellulose ethers, cellulose nitrate resins, polymaleic anhydrides, acetal polymers, polystyrene/polybutadiene copolymers, polystyrene/polymethacrylate copolymers, sulfonated polyesters, aldehyde resins, polyketone resins, polyhydroxystyrene resins and mixtures thereof.

15. The thermal ink jet ink composition of claim 1, wherein the one or more binder resins are selected from cellulose nitrate resins, polyvinyl butyral resins, polyhydroxystyrene resins, rosin esters and mixtures thereof.

16. The thermal ink jet ink composition of claim 15 wherein the binder resin has a molecular weight less than 100,000.

17. The thermal ink jet ink composition of claim 1, wherein the one or more dyes are selected from the group consisting C.I. Solvent Black 29, C.I. Solvent Orange 54, and mixtures thereof.

18. The thermal ink jet ink composition of claim 1, further comprising a surfactant.

19. The thermal ink jet ink composition of claim 18, wherein the surfactant is a polymeric surfactant.

20. The thermal ink jet ink composition of claim 1, further comprising a plasticizer.

21. The thermal ink jet ink composition of claim 1, wherein the thermal ink jet ink composition has a viscosity of less than 3 cPs.

22. A thermal ink jet cartridge including the ink of claim 1.

23. A thermal ink jet ink composition comprising:
   one or more volatile organic solvents, wherein the one or more volatile organic solvents are selected from methanol, ethanol, 1-propanol, acetone, methyl ethyl ketone, methyl n-propyl ketone, and mixtures thereof;
   one or more humectants;
   one or more binder resins, wherein the binder resins are selected from nitrocellulose, polyvinylbutyral, polyhydroxystyrene, rosin esters, and mixtures thereof; and
   one or more dyes, wherein the thermal ink jet ink composition has a decap time of at least 15 seconds and a dry time of 5 seconds or less on a non-porous substrate when used in a thermal ink jet print head.

24. A method for printing images on a substrate with a thermal ink jet printer, comprising:
   providing a thermal ink jet ink composition comprising:
      one or more volatile organic solvents, wherein the one or more volatile organic solvents are selected from $C_1$-$C_4$ alcohols, $C_3$-$C_6$ ketones, and mixtures thereof;
      one or more humectants, wherein the humectants are present in an amount not more than 30% by weight of the ink jet ink composition;
      one or more binder resins; and
      one or more dyes, wherein the thermal ink jet ink composition optionally includes water up to 10% by weight of the ink jet ink composition;
   using a thermal ink jet print head to direct droplets of the thermal ink jet ink composition to a substrate; and
   allowing the ink droplets to dry, thereby printing images on a substrate,
   wherein the thermal ink jet ink composition has a decap time of at least 15 seconds when used in a thermal ink jet print head.

25. The thermal ink jet ink composition of claim 24, wherein the thermal ink jet ink composition has a dry time of less than 5 seconds on a non-porous substrate when used in the thermal ink jet print head.

26. A printing system comprising:
a thermal ink jet cartridge containing a thermal ink jet ink composition comprising:
  one or more volatile organic solvents, wherein the one or more volatile organic solvents are selected from $C_1$-$C_4$ alcohols, $C_3$-$C_6$ ketones, and mixtures thereof;
  one or more humectants, wherein the humectants are present in an amount not more than 30% by weight of the ink jet ink composition;
  one or more binder resins; and
  one or more dyes, wherein the thermal ink jet ink composition optionally includes water up to 10% by weight of the ink jet ink composition; and
a thermal ink jet print head adapted to direct droplets of the thermal ink jet ink composition to a substrate;
wherein the thermal ink jet ink composition has a decap time of at least 15 seconds and a dry time of less than 5 seconds on a non-porous substrate when used in the thermal ink jet print head.

27. The thermal ink jet ink composition of claim 1, wherein the thermal ink jet ink composition optionally includes water up to 10% by weight of the ink jet ink composition.

28. The thermal ink jet ink composition of claim 1, wherein the one or more volatile organic solvents are present in an amount from about 60% to about 90% by weight of the ink jet ink composition and are selected from methanol, ethanol, acetone, methyl ethyl ketone, and mixtures thereof, and wherein the ink jet ink composition optionally includes water up to 10% by weight of the ink jet ink composition.

29. The thermal ink jet ink composition of claim 28, wherein the one or more binder resins are selected from the group consisting of polyamide resins, polyurethane resins, rosin ester resins, acrylic resins, polyvinyl butyral resins, polyesters, polyurethanes, phenolic resins, vinyl resins, ethylene vinyl acetate resins, polystyrene/polyacrylate copolymers, cellulose ethers, cellulose nitrate resins, polymaleic anhydrides, acetal polymers, polystyrene/polybutadiene copolymers, polystyrene/polymethacrylate copolymers, sulfonated polyesters, aldehyde resins, polyketone resins, polyhydroxystyrene resins and mixtures thereof.

30. The thermal ink jet ink composition of claim 28, wherein the one or more volatile organic solvents comprises methyl ethyl ketone.

31. The thermal ink jet ink composition of claim 28, wherein the one or more volatile organic solvents comprises ethanol.

32. The thermal ink jet ink composition of claim 23, wherein the thermal ink jet ink composition optionally includes water up to 10% by weight of the ink jet ink composition.

* * * * *